US011192542B2

(12) United States Patent
Kline et al.

(10) Patent No.: US 11,192,542 B2
(45) Date of Patent: Dec. 7, 2021

(54) PARKING OF AUTONOMOUS VEHICLES

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 134 days.

(21) Appl. No.: 16/123,071

(22) Filed: Sep. 6, 2018

(65) Prior Publication Data

US 2020/0079357 A1    Mar. 12, 2020

(51) Int. Cl.
*B60W 30/06* (2006.01)
*G08G 1/14* (2006.01)
*G05D 1/00* (2006.01)

(52) U.S. Cl.
CPC ........... *B60W 30/06* (2013.01); *G05D 1/0088* (2013.01); *G08G 1/14* (2013.01); *G05D 2201/0213* (2013.01)

(58) Field of Classification Search
CPC ............... B60W 30/06; G05D 1/0088; G05D 2201/0213; G08G 1/14
See application file for complete search history.

(56) References Cited

U.S. PATENT DOCUMENTS

| | | | |
|---|---|---|---|
| 9,449,512 B2 | 9/2016 | Zafiroglu et al. | |
| 9,582,998 B2 | 2/2017 | Stefan et al. | |
| 9,984,572 B1* | 5/2018 | Newman | G06K 9/00812 |
| 2017/0329346 A1 | 11/2017 | Latotzki | |
| 2017/0330144 A1* | 11/2017 | Wakim | G01C 21/34 |
| 2018/0024566 A1 | 1/2018 | Rakshit et al. | |
| 2018/0162384 A1 | 6/2018 | Kim | |
| 2018/0215374 A1* | 8/2018 | Lee | G05D 1/0225 |
| 2018/0224861 A1* | 8/2018 | Dudar | F02M 25/0854 |
| 2018/0357900 A1* | 12/2018 | Wang | G08G 1/147 |

(Continued)

OTHER PUBLICATIONS

Ash, Avery "How Will Autonomous Vehicles Alter The Parking Landscape?", Nov. 30, 2017; INRIX, retrieved from Internet: http://inrix.com/blog/2017/11/parking-hav/; 5 pgs.

(Continued)

*Primary Examiner* — Navid Ziaeianmehdizadeh
(74) *Attorney, Agent, or Firm* — Cantor Colburn LLP; Tihon Poltavets (57) ABSTRACT

Methods, systems and computer program products for parking autonomous vehicles are provided. Aspects include determining, by an autonomous vehicle, an expected period of time that the autonomous vehicle will be idle and identifying, by the autonomous vehicle, a first parking area and a first parking threshold time associated with the first parking area. Based at least in part on a determination that the first parking threshold time is greater than the expected period of time, aspects include moving the autonomous vehicle to the first parking area. Based at least in part on a determination that the first parking threshold time is less than the expected period of time, aspects also include identifying, by the autonomous vehicle, a second parking area and moving the autonomous vehicle to the second parking area.

11 Claims, 6 Drawing Sheets

(56) References Cited

U.S. PATENT DOCUMENTS

2019/0066505 A1* 2/2019 Salvucci ............... G07F 17/24
2019/0137290 A1* 5/2019 Levy .................... G05D 1/0214

OTHER PUBLICATIONS

Correa, Alejandro et al., "Autonomous Car Parking System through a Cooperative Vehicular Positioning Network", Sensors, vol. 17, No. 4, pp. 1-18.

Heaps, Russ "How Self-Driving Cars Will Impact Parking Solutions" Aug. 2016; Autotrader, retrieved from Internet: https://www.autotrader.com/car-shopping/how-self-driving-cars-will-impact-parking-solutions-256376; 7 pgs.

Holmes, Andrea "Parking demand in the autonomous vehicle era", Jul. 17, 2017; KPMG Global; retrieved from Internet: https://home.kpmg.com/xx/en/home/insights/2017/07/parking-demand-in-the-autonomous-vehicle-era.html; 7 pgs.

Lam, Albert et al. "Coordinated Autonomous Vehicle Parking for Vehicle-to-Grid Services: Formulation and Distributed Algorithm" Abstract only; IEEE Transactions on Smart Grid (Early Access); Published: Jan. 18, 2017; 2 pgs.

Mell, Peter "The MIST Definition of Cloud Computing Recommendations of the National Institute of Standards and Technology", Special Publication 800-145; Sep. 2011; U.S. Dept of Commerce; 7 pgs.

Burfeind, Mark "How Will Autonomous Vehicles Alter The Parking Landscape", Retrieved at: https://inrix.com/blog/2017/11/parking-hav/; Nov. 30, 2017; 2 pgs.

* cited by examiner

PARKING OF AUTONOMOUS VEHICLES

BACKGROUND

The present invention generally relates to autonomous vehicles and, more specifically, to parking of autonomous vehicles.

Autonomous vehicles are increasingly present on modern roadways and are often configured as cars or trucks that can be operated substantially autonomously and without human interaction. When autonomous vehicles are idle, the autonomous vehicle is parked and awaits instructions to go to a new location. Currently, when an autonomous vehicle is idle, the autonomous vehicle is configured to go to a dedicated parking place, such as a parking lot or parking garage.

SUMMARY

According to an embodiment, a system for parking autonomous vehicles is provided. The system includes a memory having computer readable computer instructions, and a processor for executing the computer readable instructions. The computer-readable instructions include instructions for determining, by an autonomous vehicle, an expected period of time that the autonomous vehicle will be idle and identifying, by the autonomous vehicle, a first parking area and a first parking threshold time associated with the first parking area. Based at least in part on a determination that the first parking threshold time is greater than the expected period of time, the computer-readable instructions include instructions for moving the autonomous vehicle to the first parking area. Based at least in part on a determination that the first parking threshold time is less than the expected period of time, the computer-readable instructions include instructions for identifying, by the autonomous vehicle, a second parking area and moving the autonomous vehicle to the second parking area.

According to another embodiment, a method for parking autonomous vehicles is provided. The method includes determining, by an autonomous vehicle, an expected period of time that the autonomous vehicle will be idle and identifying, by the autonomous vehicle, a first parking area and a first parking threshold time associated with the first parking area. Based at least in part on a determination that the first parking threshold time is greater than the expected period of time, the method also includes moving the autonomous vehicle to the first parking area. Based at least in part on a determination that the first parking threshold time is less than the expected period of time, the method further includes identifying, by the autonomous vehicle, a second parking area and moving the autonomous vehicle to the second parking area.

According to a further embodiment, a computer program product is provided. The computer program product includes a computer readable storage medium having program instructions embodied therewith. The computer-readable storage medium is not a transitory signal per se. The program instructions are executable by a computer processor to cause the computer processor to perform a method. The method includes determining, by an autonomous vehicle, an expected period of time that the autonomous vehicle will be idle and identifying, by the autonomous vehicle, a first parking area and a first parking threshold time associated with the first parking area. Based at least in part on a determination that the first parking threshold time is greater than the expected period of time, the method also includes moving the autonomous vehicle to the first parking area. Based at least in part on a determination that the first parking threshold time is less than the expected period of time, the method further includes identifying, by the autonomous vehicle, a second parking area and moving the autonomous vehicle to the second parking area.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist, on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist, on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
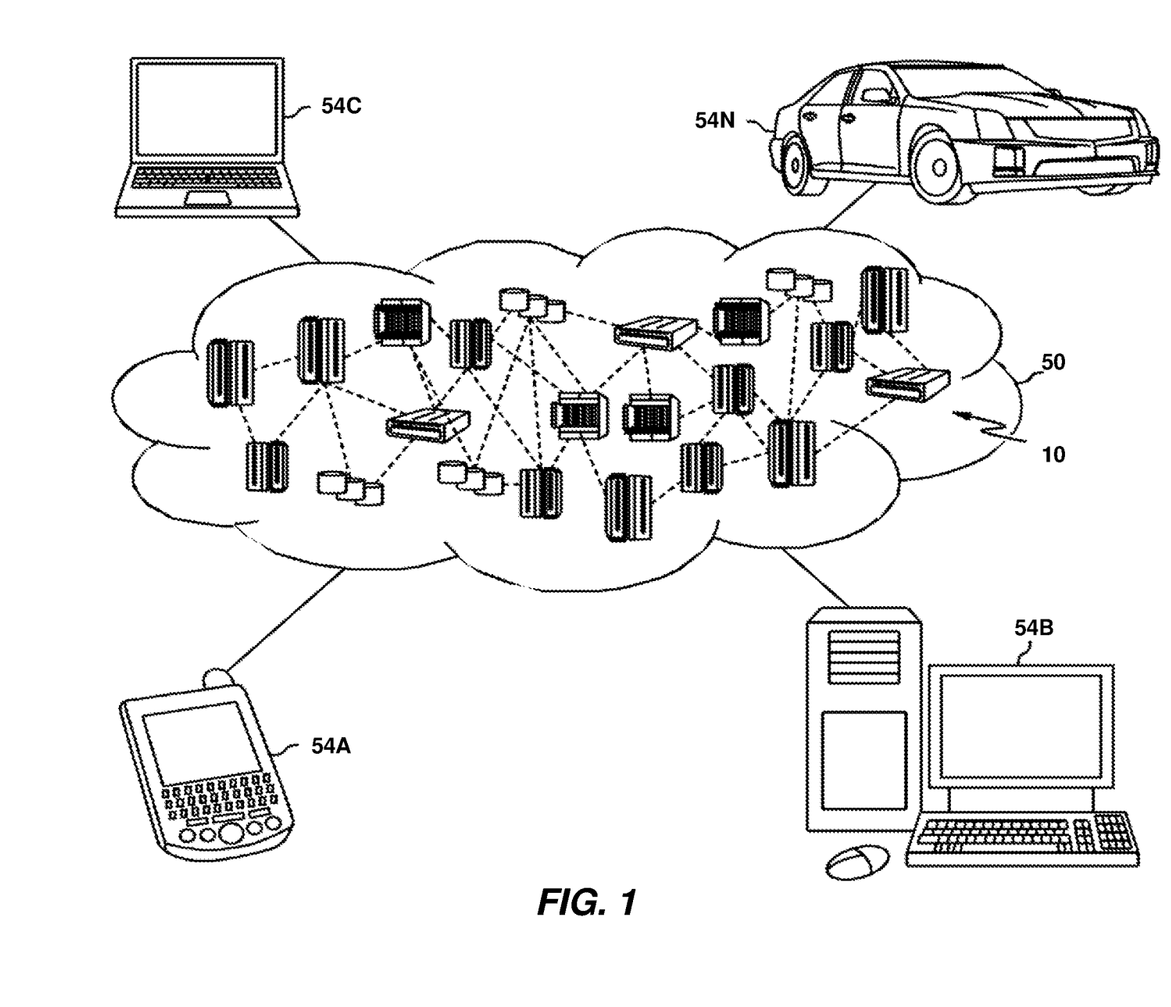
FIG. 1 depicts a cloud computing environment according to one or more embodiments of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
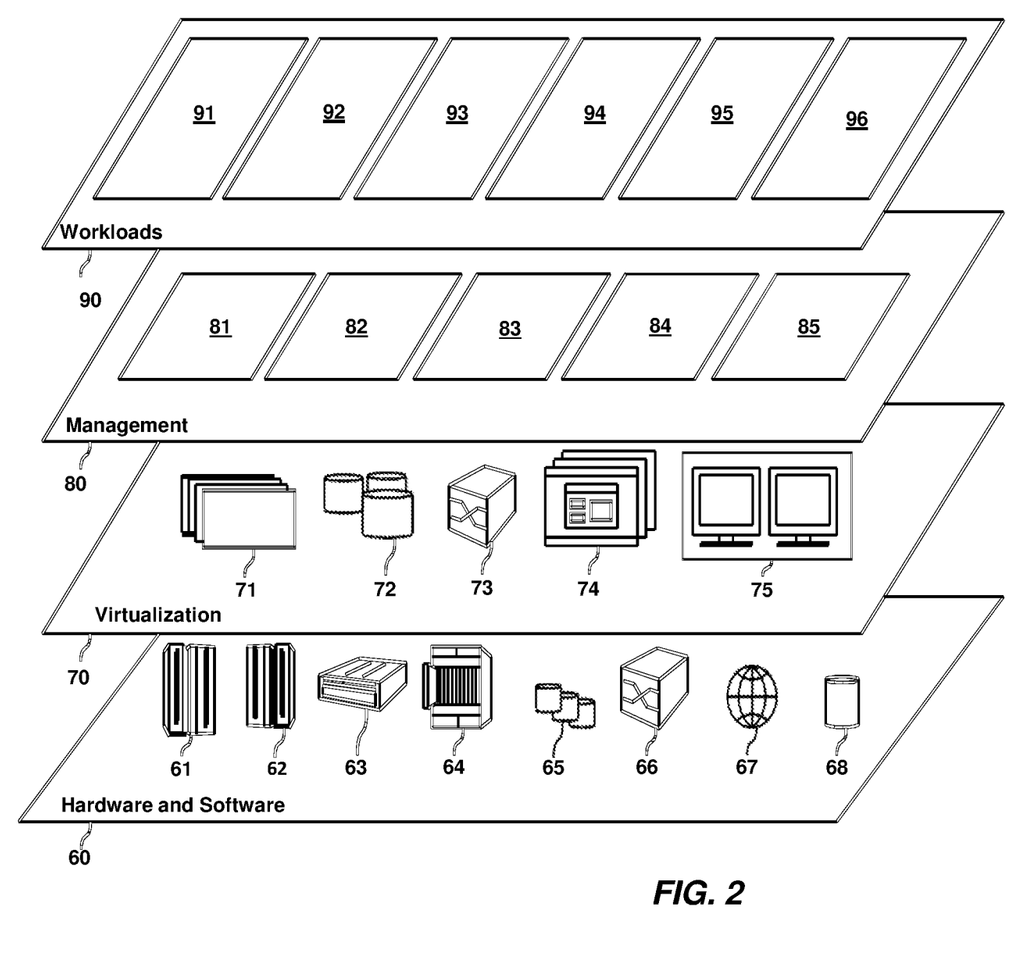
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an autonomous vehicle parking system 96.

Figure 3:
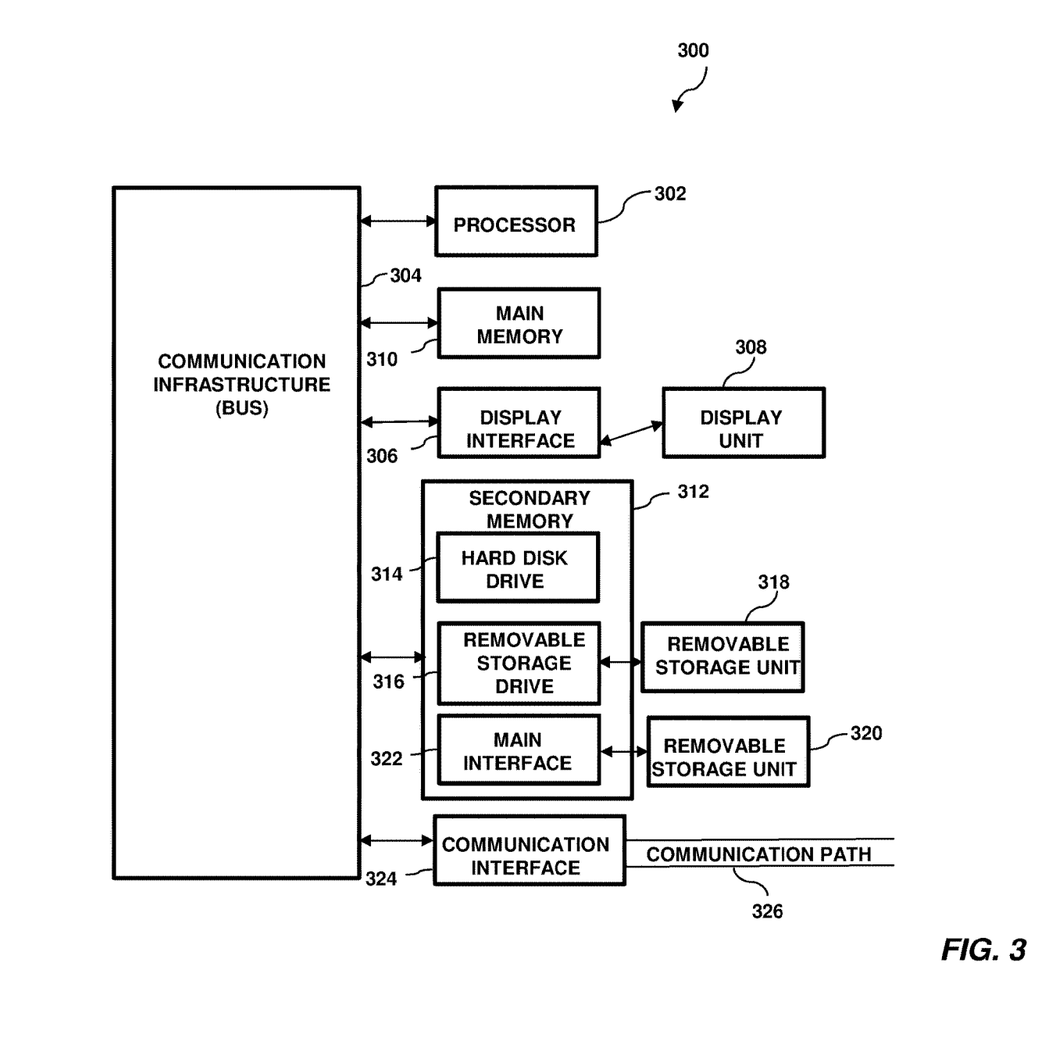
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Turning now to an overview of technologies that are more specifically relevant to aspects of the invention, autonomous vehicles are currently capable of executing a wide range of driverless operations. In particular, autonomous vehicles can communicate with each other, with one or more servers, and make certain decisions regarding driving rules. These decisions include where to park when the vehicles are in an idle state. In exemplary embodiments, when an autonomous vehicle enters an idle state, i.e., when it completes a trip and does not have another destination set, the autonomous vehicle determines where to park based on an expected idle time and based upon available parking options. In one embodiment, the autonomous vehicle determines available parking options by scanning the nearby area using sensors and/or cameras. In another embodiment, the autonomous vehicle determines available parking options by communicating with a server that tracks available parking spaces in parking lots or parking garages. More power and time is required to park the autonomous vehicle in a dedicated place in a parking lot as opposed to parking it in a nearby on-street parking spot.

In exemplary embodiments, the autonomous vehicle determines an estimated or expected idle time and bases its determination on where to park at least in part on that expected idle time. For example, if the expected idle time is less than the time it would take the autonomous vehicle to drive to and park in the parking lot, the autonomous vehicle will attempt to find another location to park. In exemplary embodiments, the autonomous vehicle can analyze the surrounding area and can identify locations that the vehicle can be parked, such as on-street parking, temporary parking areas, or in nearby parking lots. In exemplary embodiments, the autonomous vehicle determines a threshold parking time for each of the parking locations identified. The threshold parking time being the estimated amount of time that the autonomous vehicle will be permitted to park in that location. In exemplary embodiments, the autonomous vehicle bases its determination on where to park at least in part on the threshold parking time.

Figure 4:
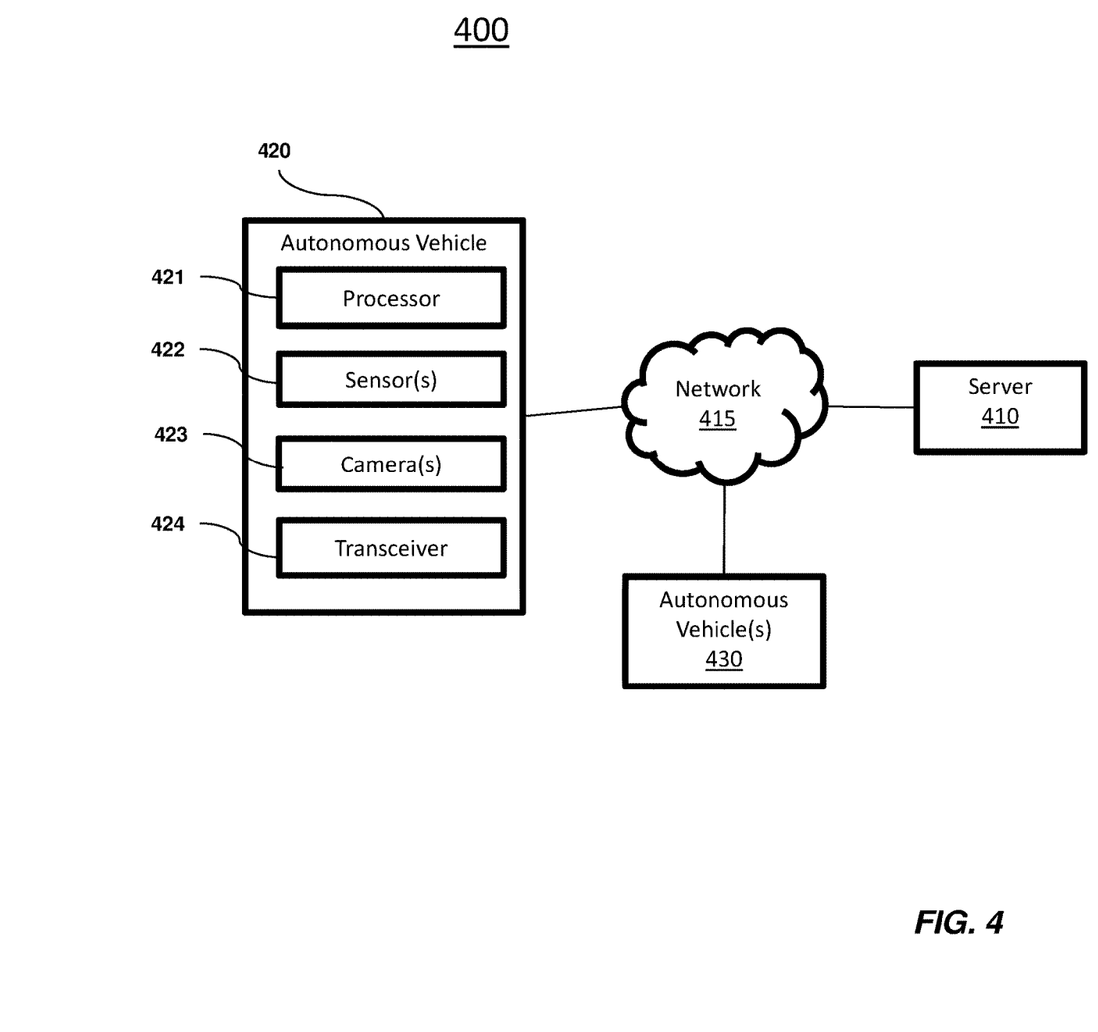
FIG. 4 depicts a system for parking of autonomous vehicles according to one or more embodiments of the present invention.

Turning now to FIG. 4, a system 400 for parking of autonomous vehicles will now be described in accordance with an embodiment. The system 400 shown in FIG. 4 includes a server 410 in communication with an autonomous vehicle 420 via a communications network 415. The communications network 415 may be one or more of, or a combination of, public (e.g., Internet), private (e.g., local area network, wide area network, virtual private network), and may include wireless and wireline transmission systems (e.g., satellite, cellular network, terrestrial networks, etc.). The autonomous vehicle 420 is also configured to communicate with one or more other autonomous vehicles 430 via the network 415. The server 410 can be implemented as a computer system such as the one shown in FIG. 3 or as a cloud-based system such as the one shown in FIGS. 1 & 2.

In exemplary embodiments, the autonomous vehicle 420 includes a processor 421, one or more sensors 422, one or more cameras 423 and a transceiver 424. The autonomous vehicles 420, 430 can be provided or configured as cars or automobiles or trucks, for example, which can be operated on roads with other driver-operated vehicles, semi-autonomous vehicles, and autonomous vehicles. In exemplary embodiments, the sensors 422 can include radar sensors, lidar sensors, optical sensors and the like. The sensors 422 are used by the processor 421 to monitor the environment that the autonomous vehicle 420 is operating in. The processor 412 of the autonomous vehicle 420 also uses the cameras 423 to monitor the environment that the autonomous vehicle 420 is operating in. The transceiver 424 is used to communicate over the network 415 and can also be used to communicate directly with other nearby autonomous vehicles 430.

Figure 5:
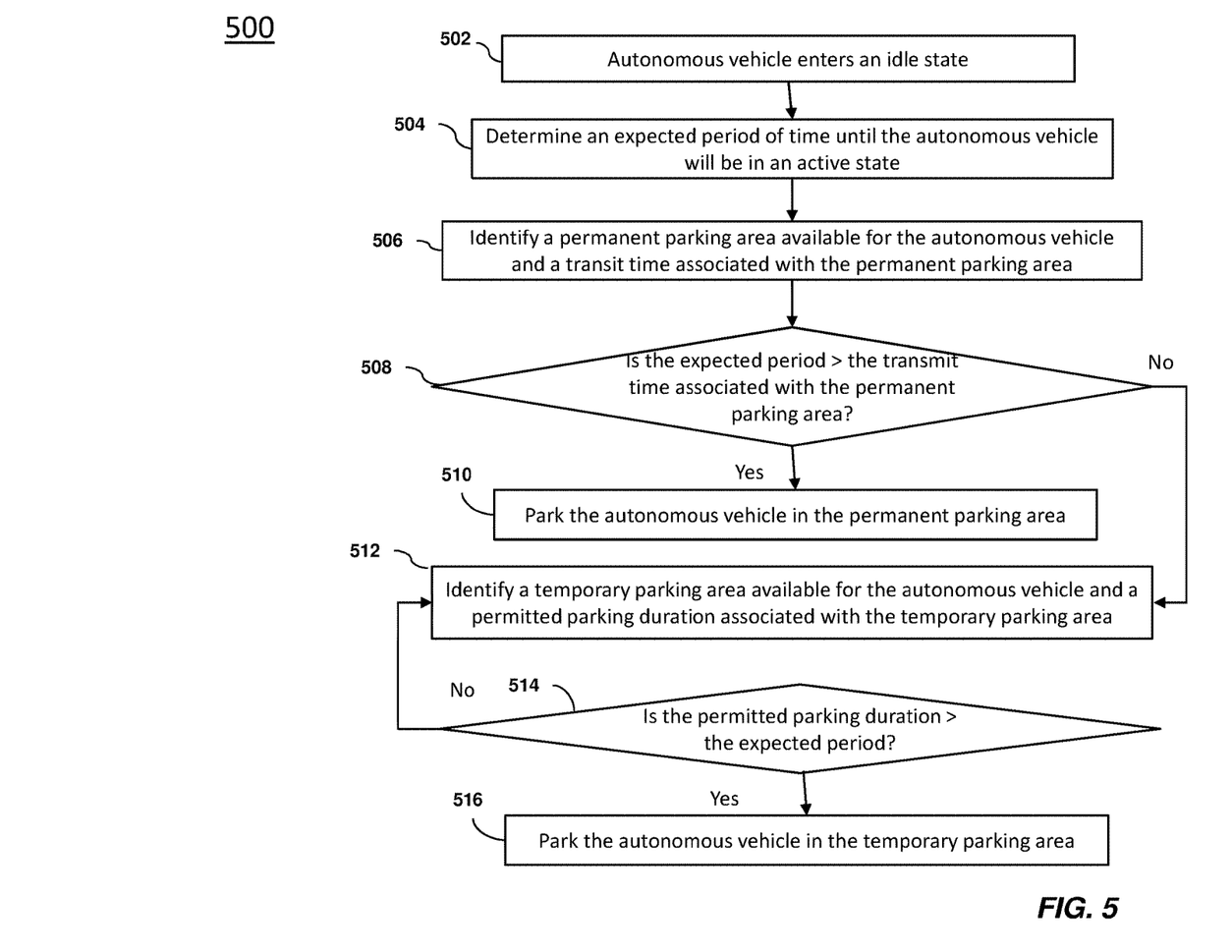
FIG. 5 is a flow diagram illustrating a method for parking of autonomous vehicles according to one or more embodiments of the present invention.

Turning now to FIG. 5, a flow diagram of a method 500 for parking of autonomous vehicles in accordance with an embodiment is shown. The method 500 begins at block 502 by the autonomous vehicle entering an idle state, i.e., the autonomous vehicle completing a trip and not having another destination. Next, as shown at block 504, the method 500 includes determining an expected period of time until the autonomous vehicle will be in an active state, i.e., the amount of time until the autonomous vehicle will be given a new destination to go to. The method 500 also includes identifying a permanent parking area available for the autonomous vehicle and a transit time associated with the permanent parking area. The transit time is the expected amount of time it would take the autonomous vehicle to drive to the permanent parking area and park.

Next, as shown at decision block 508, the method 500 includes determining if the expected period is greater than the transit time associated with the permanent parking area. If the expected period is greater than the transit time associated with the permanent parking area, then the method 500 proceeds to block 510 and the autonomous vehicle is parked in the permanent parking area. Otherwise, the method 500 proceeds to block 512 and identifies a temporary parking area available for the autonomous vehicle and a permitted parking duration associated with the temporary parking area. In exemplary embodiments, the temporary parking area is identified using one or more camera of the autonomous vehicle. The permitted parking duration associated with the temporary parking area can be determined based on a sign associated with the temporary parking area. In one embodiment, the temporary parking area is an on-street parking spot and the permitted parking duration associated with the temporary parking area is determined based on a traffic condition on the street. Next, as shown at decision block 514, the method 500 includes determining if the permitted parking duration associated with the temporary parking area is greater than the expected period. If so, the method 500 proceeds to block 516 and includes parking the autonomous vehicle in the temporary parking area. Otherwise, the method 500 returns to block 512 and identifies another temporary parking area.

In exemplary embodiments, when the autonomous vehicle is parked in a temporary parking area the autonomous vehicle will position itself to maximize the remaining available space to allow for temporary parking of other vehicles. If the temporary parking area is an on-street parking area, the autonomous vehicle will position itself to ensure that it does not cause a disruption in the flow of vehicular or pedestrian traffic.

In one embodiment, the first parking area is an on-street parking area that is identified using one or more cameras disposed on the autonomous vehicle. The first parking area may have a maximum parking time that the autonomous vehicle is permitted to stay in the first parking area. In exemplary embodiments, the second parking area is an off-street parking area such as a parking deck or parking lot.

Figure 6:
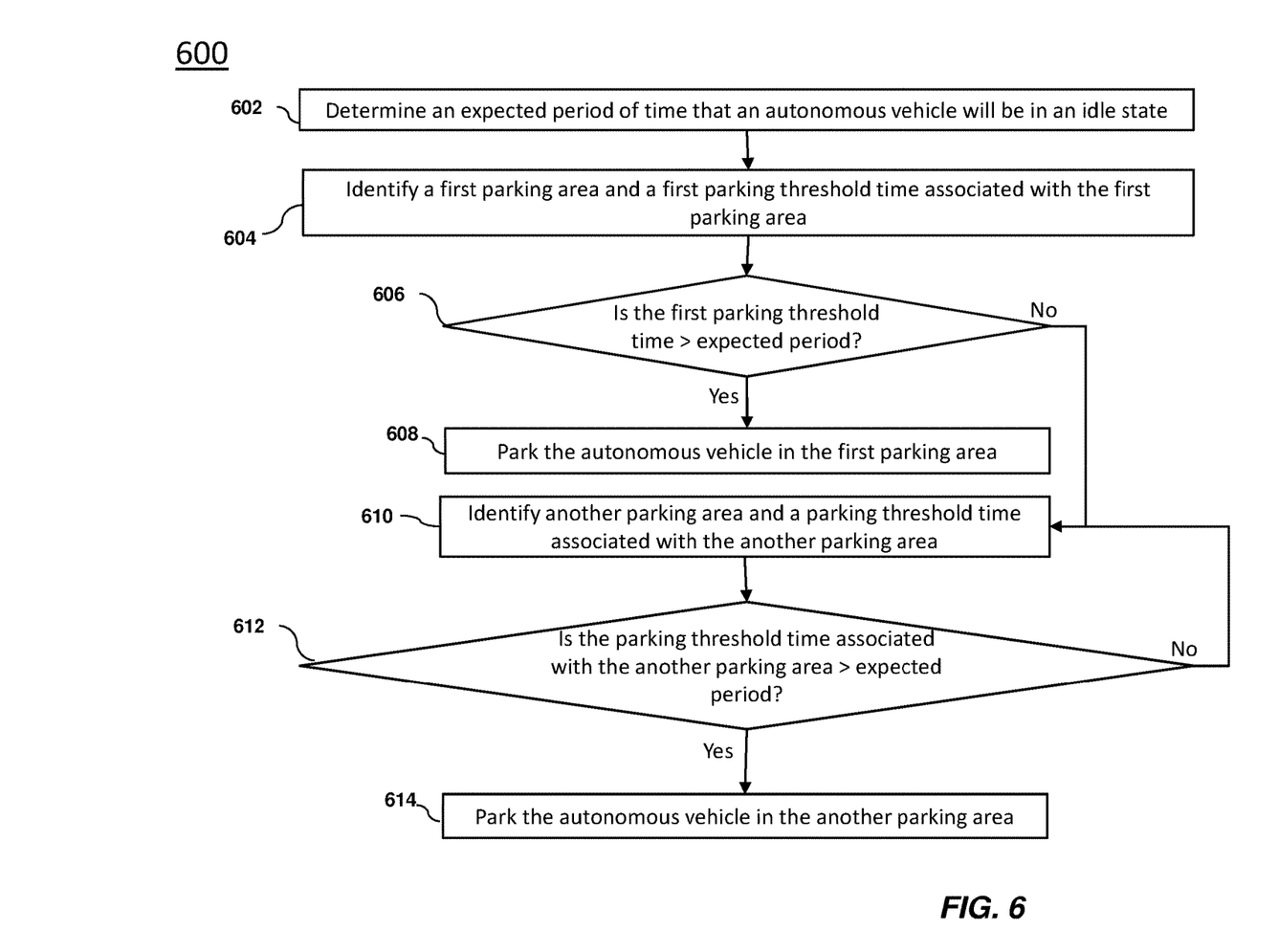
FIG. 6 is a flow diagram illustrating another method for parking of autonomous vehicles according to one or more embodiments of the present invention.

Turning now to FIG. 6, a flow diagram of a method 600 for parking of autonomous vehicles in accordance with an embodiment is shown. The method 600 begins at block 602 by an autonomous vehicle in an idle state determining an expected period of time until the autonomous vehicle will be in an active state. Next, as shown at block 604, the method 600 includes identifying, by the autonomous vehicle, a first parking area and a first parking threshold time associated with the first parking area. The first parking threshold time being an amount of time that the autonomous vehicle can park in the first parking area.

Next, as shown at decision block 606, the method 600 includes determining if the first parking threshold time associated with the first parking area is greater than the expected period. If the expected period is less than the first parking threshold time associated with the first parking area, the method 600 proceeds to block 608 and the autonomous vehicle is parked in the first parking area. Otherwise, the method 600 proceeds to block 610 and the autonomous vehicle identifies another parking area and a parking threshold time associated with another parking area. Then, as shown at decision block 612, the method 600 includes determining if the parking threshold time associated with another parking area is greater than the expected period. If the expected period is less than the parking threshold time associated with another parking area, the method 600 proceeds to block 614 and the autonomous vehicle is parked in another parking area. Otherwise, the method 600 returns to block 610 and finds another parking area.

In exemplary embodiments, the determination to park the autonomous vehicle in the first parking area can be further based on a traffic condition on the street on which the on-street parking area is located. In one example, the autonomous vehicle is on a one-way street that is five lanes wide and the expected period is less than a threshold, such as five or ten minutes. In this case, the autonomous vehicle can be configured to park in one of the two outer traffic lanes based on the traffic conditions it observes and/or historical traffic patterns. If the traffic on the road is light and parking the autonomous vehicle will not impede the flow of traffic, the autonomous vehicle will park in one of the outer travel lanes. However, if the traffic is heavy, the autonomous vehicle will not park in a travel lane.

In exemplary embodiments, when an autonomous vehicle is parked in a temporary parking area, such as an on-street parking area, it can receive a request to vacate that parking area. The request can be received from another autonomous vehicle or from another source. In one embodiment, a first autonomous vehicle is parked in a temporary parking area and a second autonomous vehicle wants to park in the temporary parking area occupied by the first autonomous vehicle. In this case, the two autonomous vehicles communicate with one another and determine which vehicle has a priority and the autonomous vehicle with the higher priority will be able to use the parking area. The priority can be determined based on the characteristics of the autonomous vehicles, such as size, fuel type, remaining fuel, vehicle type, etc. The vehicle type can include a small passenger vehicle, a large passenger vehicle, a delivery vehicle, an emergency response vehicle, or the like. The priority can be determined based on the expected idle time of the autonomous vehicles, such that vehicles with a lower expected idle time are given a higher priority than vehicles with a higher expected idle time.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for parking of autonomous vehicles, the method comprising:
   determining, by an autonomous vehicle, an expected period of time that the autonomous vehicle will be idle;
   identifying, by the autonomous vehicle, a first parking area and a first parking threshold time associated with the first parking area, wherein the first parking area is an on-street parking area;
   based at least in part on a determination that the first parking threshold time is greater than the expected period of time, moving the autonomous vehicle to the first parking area, wherein moving the autonomous vehicle to the first parking area is further based on a traffic condition on the street on which the on-street parking area is located;
   based at least in part on a determination that the first parking threshold time is less than the expected period of time, identifying, by the autonomous vehicle, a second parking area and moving the autonomous vehicle to the second parking area; and
   receiving, by the autonomous vehicle while parked in the first parking area, a request to vacate the first parking area received from another autonomous vehicle,
   wherein a priority for the first parking area between the autonomous vehicle and the another autonomous vehicle is determined based on characteristics of the autonomous vehicle and the another autonomous vehicle, wherein the characteristics include a size, a vehicle type, a fuel type, and a remaining fuel level, wherein the vehicle type is one of a passenger vehicle, a delivery vehicle, an emergency response vehicle.

2. The method of claim 1, further comprising moving the autonomous vehicle to the second parking area based at least in part on a determination that the expected period of time is greater than a second transit time associated with the second parking area.

3. The method of claim 1, wherein the first parking area is identified using one or more cameras disposed on the autonomous vehicle.

4. The method of claim 1, wherein the second parking area is an off-street parking area.

5. A system for parking an autonomous vehicle, comprising:
   a memory having computer readable instructions; and
   a processor for executing the computer readable instructions, the computer readable instructions including instructions for:

determining an expected period of time that the autonomous vehicle will be idle;

identifying a first parking area and a first parking threshold time associated with the first parking area, wherein the first parking area is an on-street parking area;

based at least in part on a determination that the first parking threshold time is greater than the expected period of time, moving the autonomous vehicle to the first parking area, wherein moving the autonomous vehicle to the first parking area is further based on a traffic condition on the street on which the on-street parking area is located;

based at least in part on a determination that the first parking threshold time is less than the expected period of time, identifying a second parking area and moving the autonomous vehicle to the second parking area; and receiving, by the autonomous vehicle while parked in the first parking area, a request to vacate the first parking area received from another autonomous vehicle, wherein a priority for the first parking area between the autonomous vehicle and the another autonomous vehicle is determined based on characteristics of the autonomous vehicle and the another autonomous vehicle, wherein the characteristics include a size, a vehicle type, a fuel type, and a remaining fuel level, wherein the vehicle type is one of a passenger vehicle, a delivery vehicle, an emergency response vehicle.

6. The system of claim 5, wherein the computer readable instructions further include instructions for moving the autonomous vehicle to the second parking area based at least in part on a determination that the expected period of time is greater than a second transit time associated with the second parking area.

7. The system of claim 5, wherein the first parking area is identified using one or more cameras disposed on the autonomous vehicle.

8. The system of claim 5, wherein the second parking area is an off-street parking area.

9. A computer program product comprising a non-transitory computer readable storage medium having program instructions embodied therewith the program instructions executable by a computer processor to cause the computer processor to perform a method, comprising:

determining, by an autonomous vehicle, an expected period of time that the autonomous vehicle will be idle;

identifying, by the autonomous vehicle, a first parking area and a first parking threshold time associated with the first parking area, wherein the first parking area is an on-street parking area;

based at least in part on a determination that the first parking threshold time is greater than the expected period of time, moving the autonomous vehicle to the first parking area;

based at least in part on a determination that the first parking threshold time is less than the expected period of time, identifying, by the autonomous vehicle, a second parking area and moving the autonomous vehicle to the second parking area, wherein moving the autonomous vehicle to the first parking area is further based on a traffic condition on the street on which the on-street parking area is located; and receiving, by the autonomous vehicle while parked in the first parking area, a request to vacate the first parking area received from another autonomous vehicle, wherein a priority for the first parking area between the autonomous vehicle and the another autonomous vehicle is determined based on characteristics of the autonomous vehicle and the another autonomous vehicle, wherein the characteristics include a size, a vehicle type, a fuel type, and a remaining fuel level, wherein the vehicle type is one of a passenger vehicle, a delivery vehicle, an emergency response vehicle.

10. The computer program product of claim 9, wherein the method further includes moving the autonomous vehicle to the second parking area based at least in part on a determination that the expected period of time is greater than a second transit time associated with the second parking area.

11. The computer program product of claim 9, wherein the first parking area is identified using one or more cameras disposed on the autonomous vehicle.

\* \* \* \* \*